March 25, 1969  D. H. COWLES  3,434,384
LATHE ATTACHMENT
Filed Jan. 9, 1967  Sheet 1 of 2
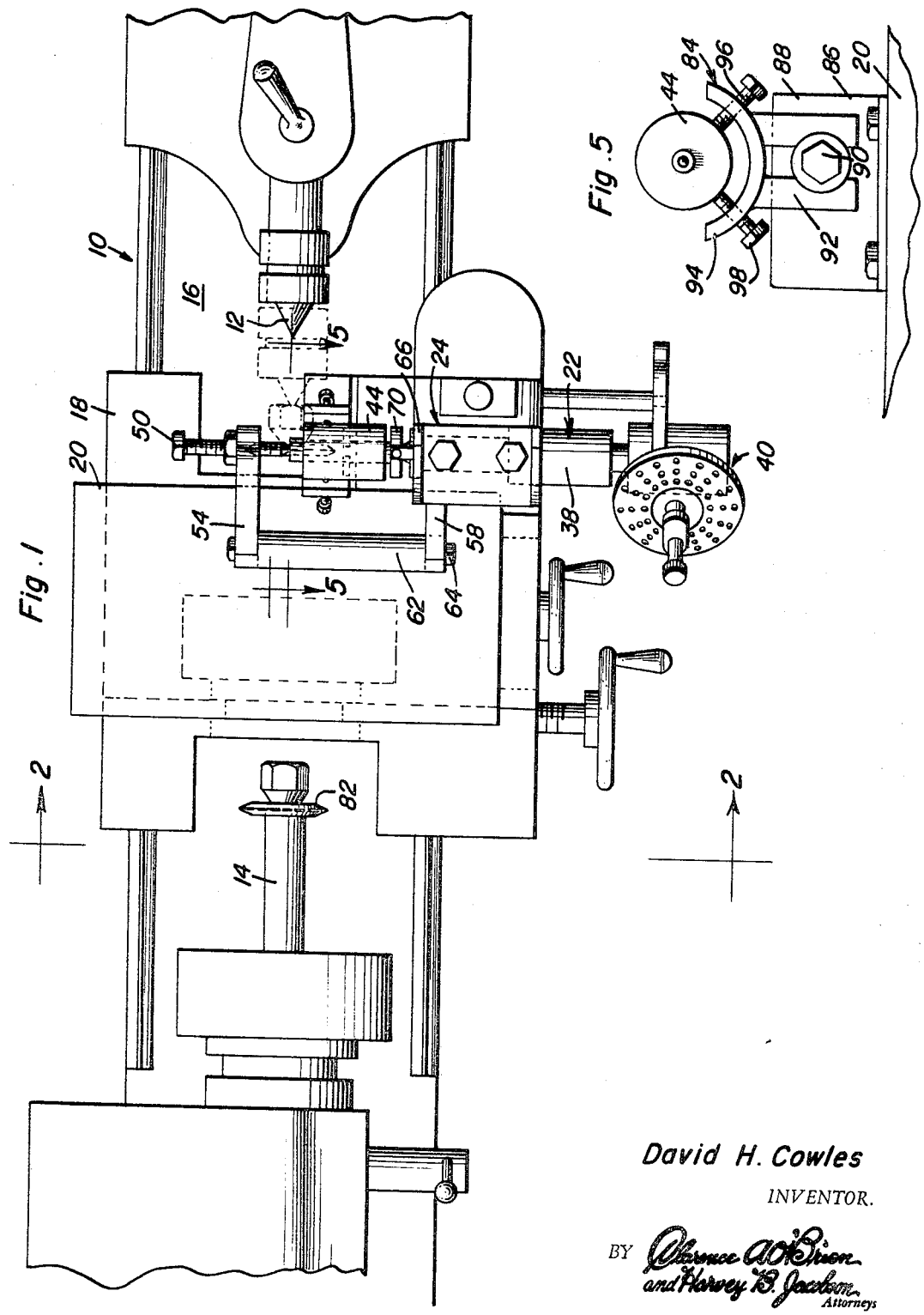
David H. Cowles
INVENTOR.
BY
Attorneys

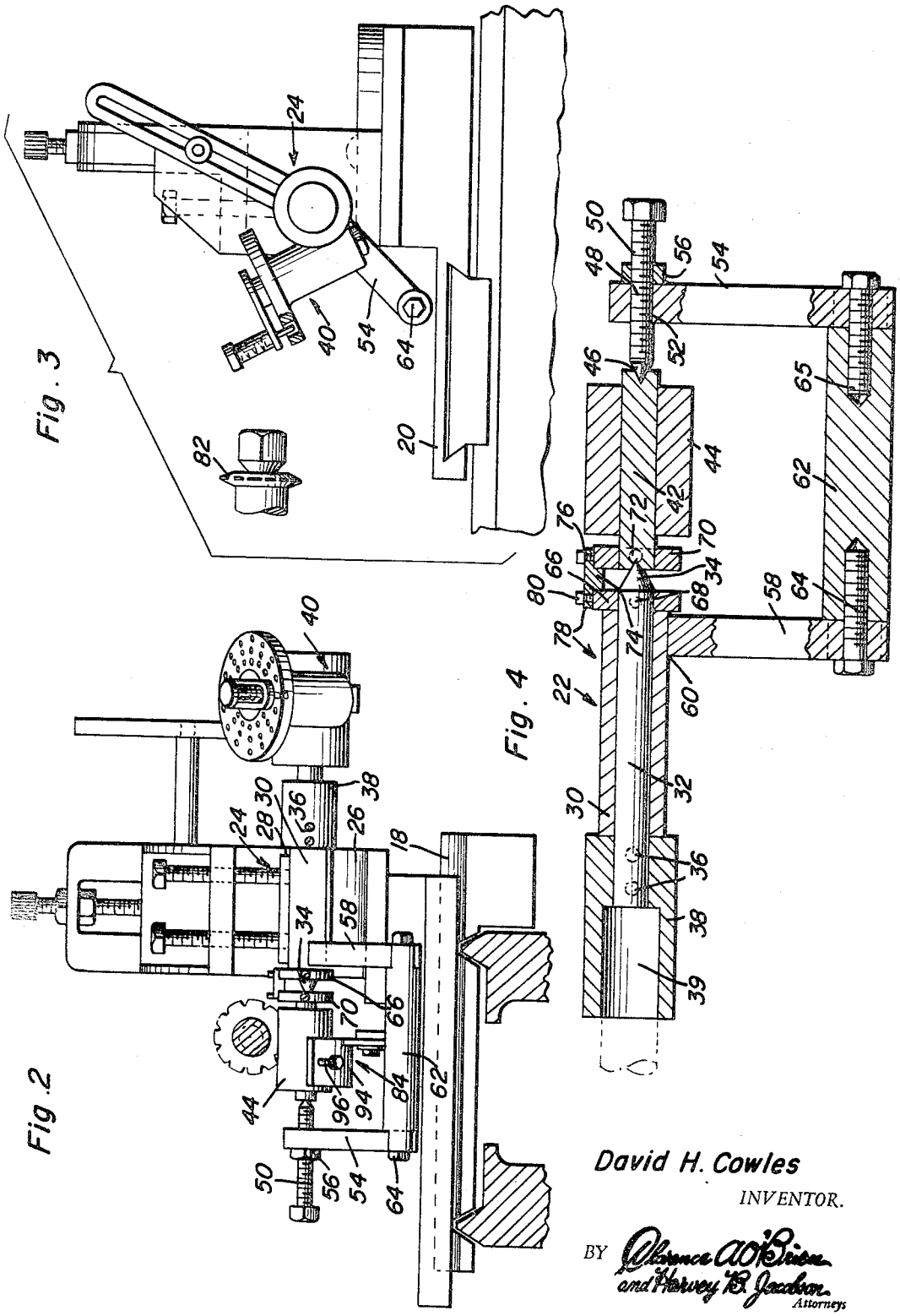

United States Patent Office 3,434,384
Patented Mar. 25, 1969

3,434,384
LATHE ATTACHMENT
David H. Cowles, Rte. 6, 3508 E. Orangeburg,
Modesto, Calif. 95350
Filed Jan. 9, 1967, Ser. No. 607,966
Int. Cl. B23c 7/02; B23f 23/00
U.S. Cl. 90—11                                              7 Claims

ABSTRACT OF THE DISCLOSURE

An attachment for lathes in the form of a work holder rotatably supporting and indexing the workpiece so that milling and drilling operations can be performed on a conventional lathe. The attachment is mounted in a vise on the cross feed of a lathe and connected with a dividing head for indexing the workpiece in predetermined positions.

---

This invention generally appertains to improvements in attachments for lathes and more particularly relates to a novel rotating work holder whereby milling and drilling work that requires indexing can be carried out by a conventional lathe, without necessitating any modification of the lathe supporting or operating structure.

An important object of the present invention is to provide a simple and compact lathe attachment in the nature of a rotating work holder for supporting work so that the work can be milled, drilled and whereby the size of the work that can be held and the length of the cut that can be made are in direct proportion to the size of the lathe on which the attachment is mounted.

A further important object of the present invention is to provide a lathe attachment for indexing work and which operates on the principle of using the lathe and a milling vise and a dividing head with a very simple and uncomplicated attachment, constructed in accordance with the present invention and structurally and functionally related with the ordinary features or components of a lathe, such as the milling vise and dividing head, without modification thereof, for supporting work whereby various operations, such as milling and drilling, can easily be performed thereon.

A still further important object of the present invention is to provide an extremely simple, highly efficient and effective and extremely inexpensive work holder for attachment to a lathe, without modification of the lathe, so that various work operations can be performed on work, which could not otherwise be performed by a lathe.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIGURE 1 is a top plan view, showing generally a lathe construction with a work holder or attachment, constructed in accordance with the present invention, structurally associated therewith and shown in top plan;

FIGURE 2 is a transverse vertical sectional view, taken substantially on line 2—2 of FIGURE 1;

FIGURE 3 is a side elevational view of the dividing head and indexing means, utilized in association with the attachment for the indexing of work supported by the attachment of the present invention;

FIGURE 4 is a detailed longitudinal sectional view of the work holding attachment of the present invention, and FIGURE 5 is a detailed, longitudinal vertical sectional view, taken substantially on line 5—5 of FIGURE 1 and showing in elevation a work rest or support.

Referring now more particularly to the accompanying drawings, the lathe, generally designated by the reference numeral 10, is of conventional overall construction and comprises a head and tailstock 12 and 14 disposed above the bed 16 with a longitudinal feed 18 mounted on the bed and supporting a cross slide or carriage 20.

The present invention relates to the provision of a work holder attachment 22 which is structurally related with a more or less conventional milling vise 24 that is carried by the cross slide 20. The milling vise 24 comprises a fixed jaw 26 and an adjustable jaw 28, the vise being operatively mounted on the cross slide 20.

The lathe attachment 22 of the present invention includes a hollow cylindrical shaft 30, which is clamped between the jaws and within which a shaft 32 is rotatably disposed, the shaft 32 terminating at its inner end in a center 34. The shaft 32 is secured by radial setscrews 36 within a collar 38, the collar 38 being fixedly circumposed on the extending outer end of the shaft 32, as shown in FIGURE 4, and being operatively associated by means of a counterbore 39 with a rotatable shaft of a conventional indexing means 40.

The center 34 supports one end of a work arbor 42, the work 44 being circumposed thereon and the opposing end of the arbor being supported by the center 46 of an adjustment screw 48. The adjustment screw 48 has its threaded shank portion 50 disposed through an aperture 52 in a supporting arm 54 and held in set positions of adjustment by a locking nut 56. The arm 54 is supported by a parallel arm 58, which is secured, as by welding 60 or the like, to the outer end of the shaft 30 with the arms 54 and 58 being rigidly interconnected and held in spaced parallel relationship by a connecting rod 62 fixed by bolt means 64 and 65 to the outer ends of the arms 54 and 58, with the threaded shanks of the bolt means being disposed within suitable end axial bores in the connecting rod 62 and passing through suitable transverse apertures in the outer ends of the arms 54 and 58.

A collar 66 is circumposed on the outer end portion of the shaft 32 inwardly of the center 34 and is held in place by a setscrew 68 while a companion collar 70 is circumposed on the extending and adjoining end portion of the work arbor 42 and held in place by a setscrew 72. The collars 66 and 70 are rigidly interconnected by a bridge element 74 which has a central portion 76 interposed between the collars and end portions 78 overlying certain portions of the periphery of the collars and being fixed thereto by setscrews 80.

With reference to FIGURES 1 and 3, it can be appreciated that the milling or cutting tool 82, power located between and driven by the head and tailstocks can be arranged so as to mill or cut the work 44. By operating the indexing means 40, the shaft 32 will rotate the work holding arbor 42 and rotate the work 44 about its long axis so as to adjust it in relation to the cutter or milling tool 82, which is transversely orientated with respect to the longitudinal extent of the lathe bed 16.

If it is desired to make various angular cuts, then the shaft 30 can be adjusted with respect to the jaws 26 and 28 of the vise 24. Therefore, there is a bodily adjustment or positioning of the work to various angular positions relative to the long axis of the work bed and a rotatable positioning of the work about its axis or about the work holding arbor 42 in a fixed plane transverse of the long axis of the lathe bed.

As shown in FIGURES 1 and 5, a work rest or holder 84 is provided and includes a fixed support 86 on the cross slide 20, which support 86 has an upstanding vertical wall 88 carrying an adjustment bolt 90 which is utilized to adjustably anchor the companion legs 92 of a saddle 94 in vertically adjusted positions on the supporting wall 88. The saddle 94 is provided with a pair of adjustment screws 96 and 98 which support the work 44 at their inner ends, as shown clearly in FIGURE 5.

The size of the work that can be held and the length of the cut that can be made are in direct proportion to the size of the lathe the attachment is used on. To explain this there is a maximum size of work that can be done which is determined by the size of the throat of the attachment but the actual diameter of the work and the length of the cut are determined by the size of the lathe.

To explain this further, if you mount this attachment 22 in a 14" lathe the maximum diameter of the work probably would be four or five inches. The type of milling cutter would have some bearing on this. Mounted in an 18" lathe the maximum diameter would increase to around 7½ inches. The length of the cut which could be made would also increase. When the maximum diameter of the work as determined by the throat of the attachment is reached it follows that an increase in the size of the throat would continue to increase the capacity of the attachment. There are two very important things to consider in this. (1) The same indexing attachment is used throughout and the proper size milling vise for the lathe on which this attachment is to be used is all that is necessary. (2) Remember also that after the work is positioned the support is brought up under the work and bears the force of the cutter. This takes care of the problem that arises when a cut is made on the outer end of the workpiece.

The work is raised or lowered by the vertical slide of the milling vise. There are three ways that the work can be fed into the cutter. The longitudinal feed of the lathe, the crossfeed of the lathe and the vertical feed of the milling vise.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a lathe having a bed provided with a cross feed, a headstock and a tailstock, said headstock supporting and powering a milling cutter; a vise means mounted on the cross feed, a hollow shaft adjustably fixed in the vise means and arranged normal to the bed, an indexing means, shaft means rotatably associated with the indexing means and rotated thereby, said shaft means being rotatably disposed within the hollow shaft and having an outer tapered centering end, a work arbor centered at one end on said centering end, rotatable drive connection means between the shaft means and the work arbor to rotate the arbor which is adapted to have a workpiece circumposed thereon and acted upon by the milling cutter, centering means having a tapered centering end supporting the outer end of the work arbor and means connected between the centering means and the hollow shaft for supportig the centering means in axial alignment with the shaft means.

2. The invention of claim 1, wherein said hollow shaft is adjustable in the vise means for bodily orientating the entire assembly in angular relationship to the lathe bed and the milling cutter and for adjustable vertical positioning of the assembly relative to the lathe bed.

3. The invention of claim 2, wherein means is provided for structurally associating the shaft means with the indexing means so that the shaft means is rotated by the indexing means independent of movement of the hollow shaft in the vise means.

4. The invention of claim 3, wherein said rotatable drive connection means between the shaft means and the work arbor includes a pair of collars fixed on the adjoining end portion of the shaft means and the adjoining end portion of the work arbor, radial setscrews fixedly circumposing said collars on said shaft means and work arbor and interconnecting means between the collars.

5. The invention of claim 4, wherein said interconnecting means comprises a bridge element and means fixing said bridge element to the collars.

6. The invention of claim 5, wherein the means connected between the center means and the hollow shaft for supporting the center means comprises a rigid arm radially extending from the hollow shaft, a companion arm having means of supporting the center means and a rigid connection fixed between the shafts so as to dispose the shafts in parallel relation.

7. The invention of claim 6, wherein said center means is adjustably disposed in the arm and locknut means is provided for locating it in adjusted positions within the arm and a work support on the cross feed on which the workpiece is adapted to rest.

References Cited

UNITED STATES PATENTS

| | | | |
|---|---|---|---|
| 1,576,719 | 3/1926 | Chaplin | 90—56 X |
| 2,591,552 | 4/1952 | Keef | 90—163 X |
| 2,668,719 | 2/1954 | Harmon | 90—56 |

ANDREW R. JUHASZ, Primary Examiner.

G. WEIDENFELD, Assistant Examiner.

U.S. Cl. X.R.

90—56